United States Patent [19]
Lincoln et al.

[11] Patent Number: 6,075,790
[45] Date of Patent: Jun. 13, 2000

[54] ASYNCHRONOUS TRANSFER MODE SYSTEM FOR, AND METHOD OF, WRITING A CELL PAYLOAD BETWEEN A CONTROL QUEUE ON ONE SIDE OF A SYSTEM BUS AND A STATUS QUEUE ON THE OTHER SIDE OF THE SYSTEM BUS

[75] Inventors: Bradford C. Lincoln, Boulder; David R. Meyer, Lakewood, both of Colo.

[73] Assignee: Brooktree Corporation, San Diego, Calif.

[21] Appl. No.: 08/764,692

[22] Filed: Dec. 11, 1996

[51] Int. Cl.⁷ .................................................. H04L 12/28
[52] U.S. Cl. ............................................................. 370/398
[58] Field of Search ..................................... 370/397, 398, 370/399, 395, 412, 419, 474; 395/200.6, 850, 275

[56] References Cited

U.S. PATENT DOCUMENTS

| | | | |
|---|---|---|---|
| 5,136,584 | 8/1992 | Hedlund | 370/399 |
| 5,274,768 | 12/1993 | Traw et al. | 395/275 |
| 5,768,275 | 6/1998 | Lincoln et al. | 370/419 |

OTHER PUBLICATIONS

Communication Networks: A First Course by Jean Walrand—Aksen Sssociates, p. 59, 1991.

*Primary Examiner*—Huy D. Vu
*Assistant Examiner*—Alexander Boakye

[57] ABSTRACT

A status queue in a host and a control queue in a segmentation and reassembly (SAR) subsystem are on opposite sides of a host bus in a control plane. Buffer descriptors in the host and the SAR and buffers in the host are in a data plane. To transfer cell payloads to a first line interfacing the SAR, the host writes the SAR that it has such cell payloads. The host writes the host buffer descriptors into the control queue to obtain the transfer of the buffer payload to the first line. The SAR writes the status queue when the transfer has been completed. To transfer cell payloads to the host memory, the host writes into the control queue the address of the buffers to receive the payload from the SAR. The SAR then writes the buffer descriptors to the status queue to obtain the transfer of the cell payloads to the buffers. Each of the control and status queues may be respectively considered to constitute two (2) control queues and two (2) status queues. The SAR determines if either status queue is full by comparing the address written by the SAR into such status queue with the address written by the host periodically to the SAR where the host is in the status queue. The host determines if either control queue is full by comparing the address written by the host into such control queue with the address written by the SAR periodically to the host where the SAR is in the control queue.

27 Claims, 11 Drawing Sheets

FIG. 11

WRITE-ONLY CONTROL QUEUE VARIABLES

| VARIABLE | DEFINITION | LOCATION |
|---|---|---|
| WRITE | CURRENT HOST POSITION IN CONTROL QUEUE | HOST VARIABLE |
| READ_UD | LAST KNOWN SAR POSITION IN CONTROL QUEUE AS SEEN BY HOST | HOST VARIABLE |
| READ | CURRENT SAR POSITION IN CONTROL QUEUE | SAR BASE TABLE |
| INTERVAL | NUMBER OF QUEUE ENTRIES PROCESSED BY SAR BEFORE WRITING READ_UD | SAR REGISTER |
| UPDATE | NUMBER OF QUEUE ENTRIES SINCE LAST WRITE OF READ_UD FROM HOST | SAR BASE TABLE |
| READ_UD_PNTR | SAR POINTER TO READ_UD | SAR BASE TABLE |

FIG. 12

WRITE-ONLY STATUS QUEUE VARIABLES

| VARIABLE | DEFINITION | LOCATION |
|---|---|---|
| WRITE | CURRENT SAR POSITION IN STATUS QUEUE | SAR BASE TABLE |
| READ_UD | HOST KNOWN HOST POSITION IN STATUS QUEUE AS SEEN BY SAR | SAR BASE TABLE |
| READ | CURRENT HOST POSITION IN STATUS QUEUE | HOST VARIABLE |
| INTERVAL | NUMBER OF QUEUE ENTRIES PROCESSED BY HOST BEFORE WRITING READ_UD | HOST VARIABLE |
| UPDATE | NUMBER OF QUEUE ENTRIES SINCE LAST WRITE OF READ_UD | HOST VARIABLE |
| READ_UD_PNTR | HOST POINTER TO READ_UD | HOST VARIABLE |

ASYNCHRONOUS TRANSFER MODE SYSTEM FOR, AND METHOD OF, WRITING A CELL PAYLOAD BETWEEN A CONTROL QUEUE ON ONE SIDE OF A SYSTEM BUS AND A STATUS QUEUE ON THE OTHER SIDE OF THE SYSTEM BUS

This invention relates to an asynchronous transfer mode system for, and method of, transferring data cells between a control queue in a control memory on one side of a system bus and a status queue in a host memory on the other side of the system bus.

BACKGROUND OF THE INVENTION

Telephone systems in the United States provide central offices for receiving signals from calling telephones within a particular radius such as one (1) to two (2) miles from the central office and for transmitting telephone signals to such telephones. The telephone signals from a calling telephone are then transmitted through long distances from such central office. The telephone signals then pass to a receiving telephone through a central office within a radius of one (1) mile to two (2) miles from such central office.

The telephone signals are transmitted long distances between central offices through optical fibers which have replaced other media previously provided for such purposes. The optical fibers have certain distinctive advantages over the lines previously provided. They allow a significantly increased number of signals from different telephones to be transmitted at the same time through the optical fibers. They pass the digitally-encoded signals with a higher accuracy than other media.

Various systems have been adopted to carry digitally-encoded signals for telephone, video, and data services. One of such systems now being adopted is designated as asynchronous transfer mode (ATM). This system is advantageous because it recognizes that generally signals travel in only one direction at any one time between a calling subscriber and a receiving subscriber. The system preserves bandwidth in the other direction so that a maximum number of different messages can be transmitted in such direction.

In the prior art, when passing data cells from a control memory at a first station to a host through a system bus and then from the host to a recipient, the host remained on the system bus during all of such transfer. This was disadvantageous because the recipient received information from the host only intermittently. During the time that the recipient did not receive data cells from the host, the system bus was still connected to the host so that the system bus could not be used to transfer data cells for other purposes. As a practical matter, the system bus was tied to the host about seventy percent (70%) of the time. This allowed the system bus relatively little time to perform other functions.

BRIEF DESCRIPTION OF THE INVENTION

In one embodiment of the invention, a status queue in a host and a control queue in a segmentation and reassembly (SAR) subsystem are on opposite sides of a host bus in a control plane. Buffer descriptors in the host and the SAR and buffers in the host are in a data plane. To transfer cell payloads to a first line interfacing the SAR, the host writes the SAR that it has such cell payloads. The host writes the host buffer descriptors into the control queue to obtain the transfer of the buffer payload to the first line. The SAR writes the status queue when the transfer has been completed. To transfer cell payloads to the host memory, the host writes into the control queue the address of the buffers to receive the payload from the SAR. The SAR then writes the buffer descriptors to the status queue to obtain the transfer of the cell payloads to the buffers. Each of the control and status queues may be respectively considered to constitute two (2) control queues and two (2) status queues. The SAR determines if either status queue is full by comparing the address written by the SAR into such status queue with the address written by the SAR periodically to the SAR where the host is in the status queue. The host determines if either control queue is full by comparing the address written by the host into such control queue with the address written by the SAR periodically to the host where the SAR is in the control queue.

BRIEF DESCRIPTION OF THE DRAWINGS

In the drawings:

FIG. 11 is a table providing a definition of certain terms used in the flow charts shown in FIGS. 7 and 8; and FIG. 12 is a table providing a definition of certain terms used in the flow charts shown in FIGS. 9 and 10.

DETAILED DESCRIPTION OF THE INVENTION

Figure 1:
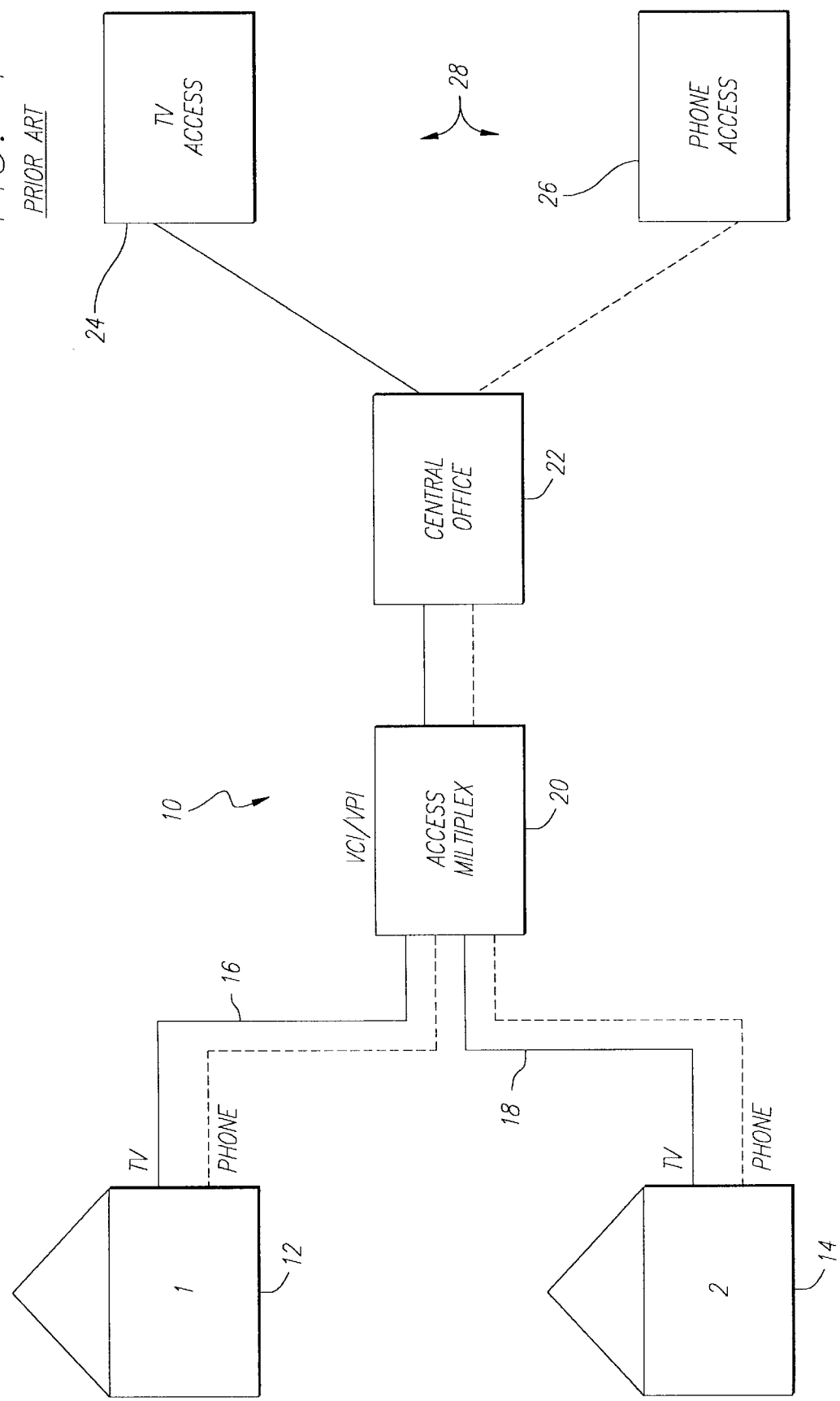
FIG. 1 is a schematic block diagram illustrating on a simplified basis the paths for transferring cells of information in an asynchronous transfer mode between a calling station and a receiving station through an access multiplex.

FIG. 1 illustrates in block form a system generally indicated at 10 and known in the prior art for transferring signals to and from a pair of telephones (or sources) 12 and 14 respectively through lines 16 and 18 to a common access multiplex 20. The telephone (or source) 12 may illustratively transmit or receive television signals and telephone (voice) signals on a line 16 and the telephone (or source) 14 may illustratively transmit or receive television signals and telephone (voice) signals on a line 18. All signals are digitally encoded. For purposes of simplification, the television signals are shown in FIG. 1 as being transferred in solid lines and the telephone signals are shown in FIG. 1 as being transferred in broken lines.

The signals in the lines 16 and 18 pass to the access multiplex 20. The respective digitally-encoded transmit signals are segmented into fixed-length cell payloads and a cell header is added to each cell payload to form a cell. Similarly, received cells are reassembled into the respective receive cells. The headers of the cells are generated in the access multiplex to provide a virtual channel indication and/or a virtual path indication. The header indicates the path which is being followed to pass the cells to a central office 22. The central office 22 may modify the header again in the cells to identify the path through which the cells are subsequently being transferred. The cells may then be transferred either to a television access 24 or to a telephone access 26 at receiving stations generally indicated at 28 in FIG. 1.

Figure 2:
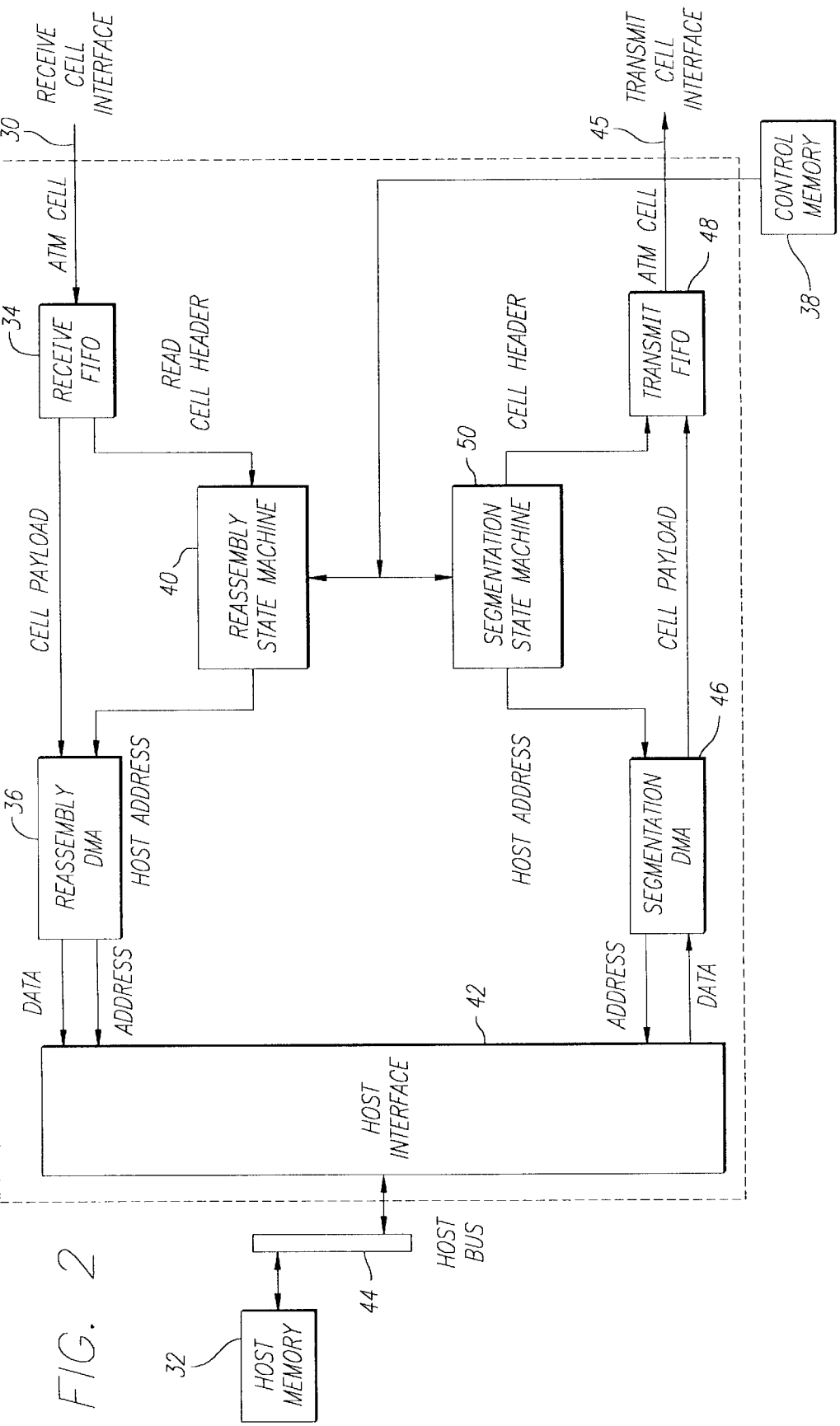
FIG. 2 is a schematic block diagram on a simplified basis of a system included in the system shown in FIG. 1 for transferring cell payloads to a transmit cell interface from a host memory or for transferring cell payloads to the host memory from a receive cell interface.

FIG. 2 illustrates one embodiment of a sub-system generally indicated at 29 and enclosed within a rectangle defined by broken lines for use with the access multiplex 20 shown in FIG. 1 for providing a controlled transfer of ATM cell payloads between a line 30 from a receive cell interface and a host memory 32. When the cells are transferred from the line 30, the cells pass through a receive FIFO 34. The FIFO 34 constitutes a first-in-first-out memory well known in the art to provide a time buffer. The payload in each cell then passes to a reassembly direct memory access (DMA) stage 36. The header in each cell passes to a reassembly state machine 40 for processing.

The header in each cell is introduced from the reassembly state machine 40 to a control memory 38 which processes the header to provide addresses that indicate where the cell payloads are to be stored in the host memory 32. The addresses are then applied through the reassembly state machine 40 to the reassembly direct memory access (DMA) stage 36 to direct the payload from the FIFO 34 through a host interface 42 to a host bus 44. The cells are then transferred in the host memory 32 to the addresses indicated by the control memory 38.

Cells may also be transferred to a transmit cell interface through a line 45 by the sub-system 29 shown in FIG. 2. The segmentation state machine 50 reads addresses from the control memory 38 that indicate where cell payloads are stored in the host memory 32. The addresses are then applied by the segmentation state machine 50 to the segmentation direct memory access (DMA) 46 to direct the cell payloads to the transmit FIFO 48. The transmit FIFO 48 may be constructed in a manner similar to the receive FIFO 34. The header is introduced by the control memory 38 to the segmentation state machine 50 for combination in the transmit FIFO 48 with the payload. The recombined cell then passes to the transmit cell interface line 45.

Figure 3:
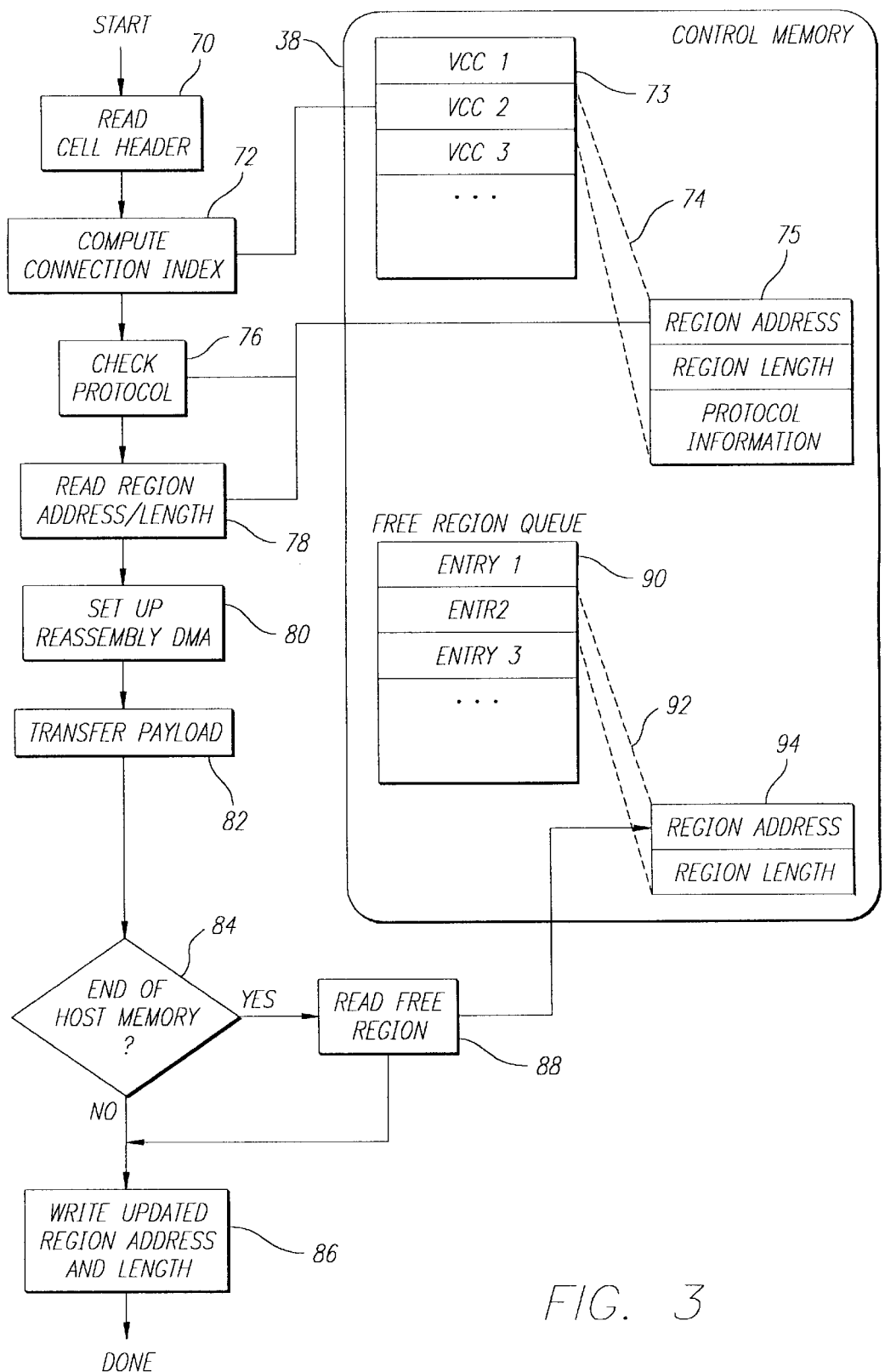
FIG. 3 is a schematic block diagram showing in additional detail the operation of the sub-system shown in FIG. 2 when the cell payloads are transferred from the receive cell interface to the host memory.

FIG. 3 illustrates in additional detail the operation of the sub-system shown in FIG. 2 in separating the header and the payload in a cell, reassembling the cell payloads and recording the reassembled payloads in the host memory 32. In the flow chart shown in FIG. 3, the cell header is initially read as at 70. The header is used to compute a "connection index" (see block 72) to yield a memory address in a reassembly state. This is indicated as a table 73 designated as "Reassembly State" in the control memory 38. The table 73 contains a plurality of virtual channel connections which are respectively designated as "VCC 1", "VCC 2", "VCC 3", etc.

Each of the virtual channel connections contains a table 75 which provides certain information including the address of a region of the host memory 38, the length of the region in the host memory and the protocol information for the virtual channel connection VCC. FIG. 3 schematically shows that the table containing the address region in the host memory 38, the length of the region and the protocol information for the virtual channel connection VCC are being selected from the virtual channel connection designated as "VCC 2". This is indicated by broken lines at 74 and by the table 75 in FIG. 3. It will be appreciated that this is schematic and illustrative and that other VCC's may be selected.

The cell from the line 30 in FIG. 2 relating to the receive cell interface is then checked with the protocol information in the VCC 2 virtual channel connection in the table 75 in the control memory 38 as indicated at 76 in FIG. 3. If the check indicates that the protocol information in the header and the payload is correct, the region address in the host memory 32 and the length of such region are read from the VCC 2 block in the control memory 38 as indicated at 78 in FIG. 3. The region address in the host memory 32 is passed to the reassembly DMA 36 in FIG. 2 as indicated at 80. The reassembly DMA 36 is then activated to transfer the cell payload from the receive FIFO 34 in FIG. 2 to the host memory 32 as indicated at 82 in FIG. 3.

As the successive cell payloads for the VCC 2 table 73 are reassembled in the region, a check is made in each reassembly to determine if the end of the region in the VCC 2 channel connection has been reached. This is indicated at 84 in FIG. 3. If the answer is "No", the region address for successive cells is incremented for the successive payloads in the VCC 2 channel connection recorded in the host memory region and the region length is decremented by the same amount. A block 86 in FIG. 3 indicates this.

If the end of the region in the VCC 2 table in the control memory 38 has been reached, a "Yes" indication is provided from the block 84. This causes a block 88 to be activated in FIG. 3. This block is designated as "Read Free Region". The control memory 38 contains a Free Region Queue indicated at 90 in FIG. 3. When the block 88 is activated, it causes the next entry in the Free Region Queue 90 to be selected. For example, when entry 1 in the Free Region Queue has been previously selected, entry 2 in the Free Region Queue 90 is now selected. This is indicated by broken lines 92 extending from the entry 2 in the Free Region Queue 90 to a table 94 in FIG. 3.

Entry 2 in the Free Region Queue contains a new region address in the host memory 38 and the length of such region. This information is transferred to the table 75 in place of the information previously recorded in the table. The blocks 78, 80, 82, 84, 86 and 88 are now operated as discussed above to transfer the payloads in the cells on the line 30 to the regions in the host memory 32. At the end of this region, entry 3 in the Free Region Queue may be selected to provide a new region address in the host memory 32 and the length of such region if the payload has not been completely recorded in the host memory 32. The steps described above are repeated in this manner until all of the payload has been recorded in the host memory 32.

Figure 4:
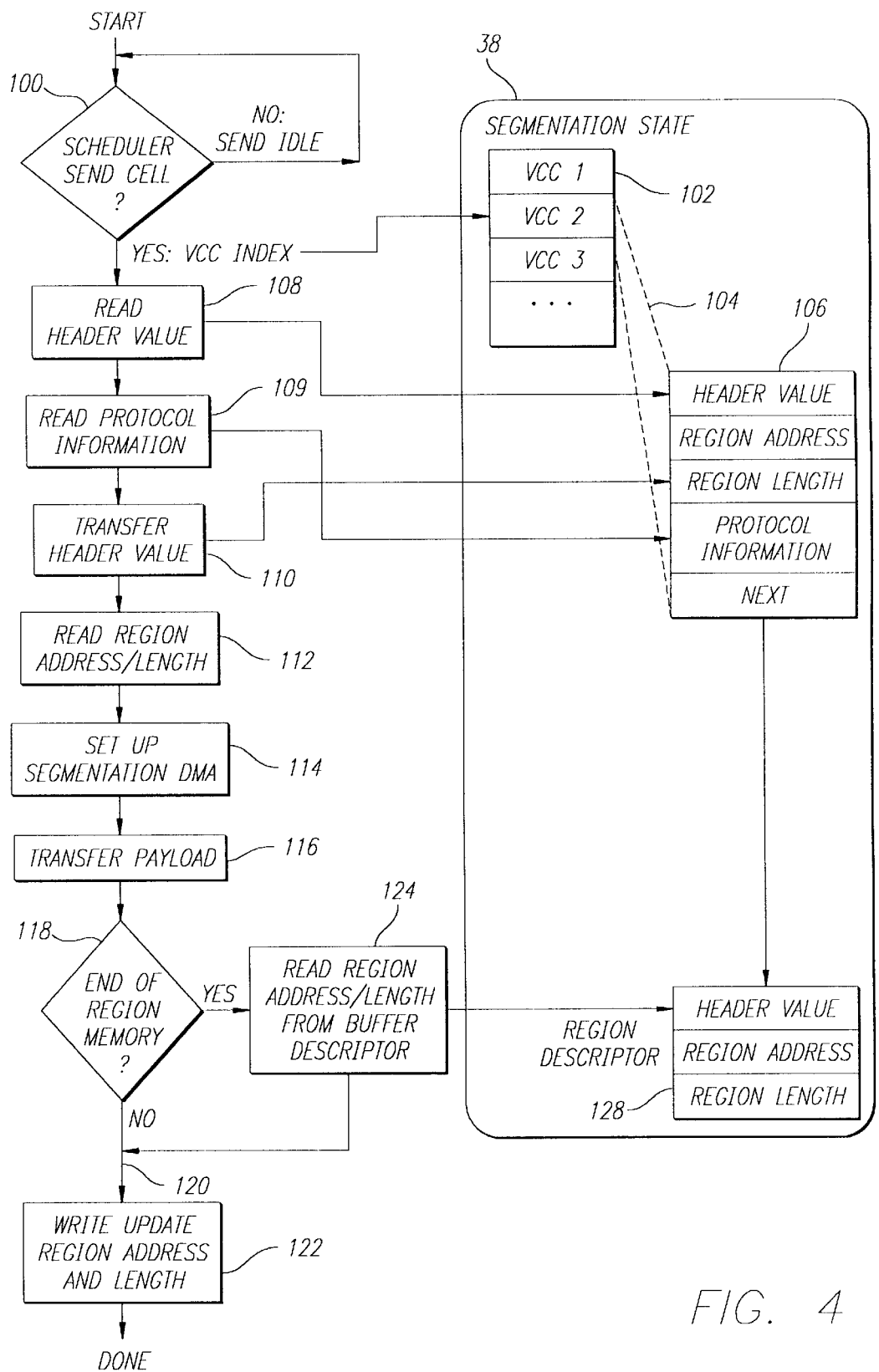
FIG. 4 is a schematic block diagram showing in additional detail the operation of the sub-system shown in FIG. 2 when the cell payloads are transferred from the host memory to the transmit cell interface.

FIG. 4 indicates in additional detail the operation of the sub-system shown in FIG. 2 in transferring the cell payloads from the host memory 32, reading the header from the control memory 38 to indicate the ATM path, combining the header and the payload into a cell and transferring the cell to the line 45 in FIG. 2. In the flow chart shown in FIG. 4, a block 100 is provided to determine if a VCC cell has been scheduled for a particular time slot. If a cell has not been scheduled, an idle cell (i.e. no cell recorded in a time slot) is transferred to the line 45 in FIG. 2. This is indicated by a line 101 in FIG. 4.

If a cell has been scheduled for the particular time slot, the block 100 in FIG. 4 selects a virtual channel connection in a table 102 in the control memory 38. This table is designated as "Segmentation State" in FIG. 4. As shown in FIG. 4, the table 102 contains a plurality of virtual channel connections which are illustratively designated as "VCC 1", "VCC 2", "VCC 3", etc. The virtual channel connection VCC 2 is illustratively shown as being selected in the table 102. This is indicated by broken lines 104. It will be appreciated that any other block could have been chosen. The virtual channel connection VCC 2 illustratively includes a header value (to indicate the path of transfer of the cell), a region address, a region length, protocol information and the position of the next region description in the host memory. This is illustrated at 106 in FIG. 2.

The header value and the protocol information in the VCC 2 block are read from the control memory 38 as indicated at 108 and 109 respectively in FIG. 4. The header value is then transferred to the transmit FIFO 48 in FIG. 2 as indicated at 110 in FIG. 4 and the region address and length are read from the VCC 2 virtual channel connection as indicated at 112 in FIG. 4. The segmentation DMA 46 in FIG. 2 is then set up (see block 114 in FIG. 4) and the payload is transferred from the host memory region to the transmit FIFO 48 in FIG. 2 (see block 116 in FIG. 4). A check is made in each transfer of the payload of a successive cell to determine if the region address being transferred for the virtual channel connection 106 is at the end of its length. This is indicated at 118 in FIG. 4.

If the end of the host region in the VCC 2 virtual channel connection has not been reached as indicated at 120 in FIG. 4, the region address at 106 in the control memory is incremented to account for the successive payload transferred to the transmit FIFO 48 and the region length is decremented by the same amount (see block 122). This provides an updated record of the region being processed in the virtual channel connection VCC 2 and an updated record of the remaining length of the region to be processed in the virtual channel connection VCC 2.

When the end of the region in the virtual channel connection VCC 2 has been reached, the address of the next region in the host memory 38 and the length of this region are read as indicated at 124. This next region is indicated as "next" in the table 106 and is indicated in additional detail by a table 128 in FIG. 4. The table 128 is designated as a "Region Descriptor" to conform to the designation in the block 124. The table 128 also contains a block designated as "Next". The table 128 is then transferred to the position of the table 106 to replace the information previously in the table 106. The address information transferred from the table 128 to the table 106 is then processed in the blocks 108, 109, 110, 112, 114, 116, 118, 120, 122 and 124 in the same manner as described above. Upon the completion of the processing of the region in the table 106, the "Next" block in the table 106 is processed to determine the subsequent host region address in the host memory 32 and the length of this region address.

Figure 5:
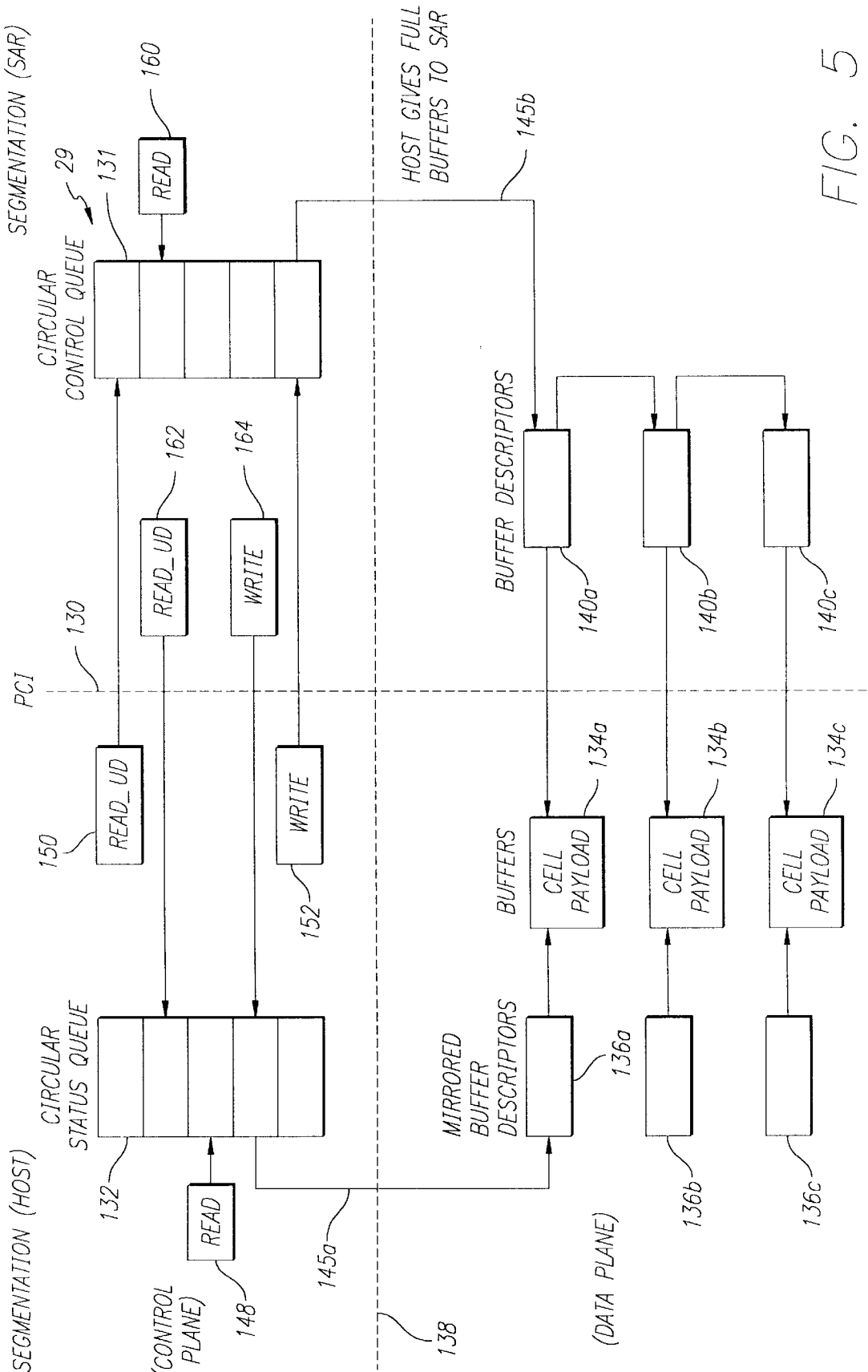
FIG. 5 is a schematic diagram indicating the operation of stages in control and data planes when information in a host memory on one side of a system bus is to be transferred to the transmit cell interface (shown in FIG. 2) on the other side of the system bus.
Figure 6:
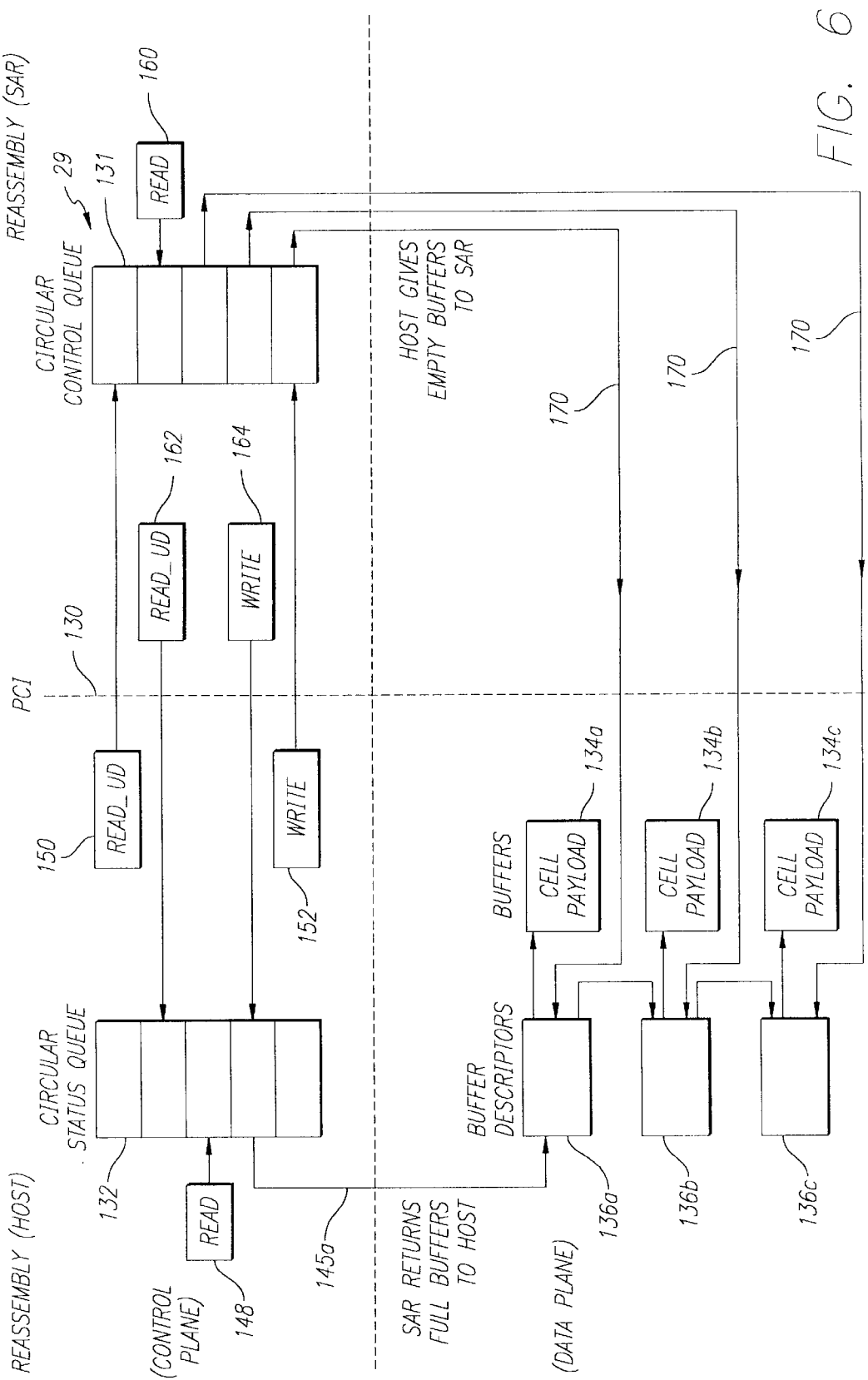
FIG. 6 is a schematic diagram indicating the operation of stages (also shown in FIG. 5) in the control and data planes when information is to be transferred from the receive cell interface (shown in FIG. 2) on one side of the system bus to the host memory on the other side of the system bus.

FIG. 5 is a schematic diagram showing the position of a system bus such as a PCI bus. This position is indicated by broken lines 130. The PCI bus may be considered to correspond to the host bus 44 in FIG. 2. A control queue 131 (which may be included in the control memory 38 in FIG. 2) in a segmentation and re-assembly (SAR) sub-system corresponding to the sub-system 29 in FIG. 2 is shown schematically in FIG. 5 to the right of the position 130 of the PCI bus. The control queue 131 may be considered to constitute two (2) control queues, one as shown in FIG. 5 and the other as shown in FIG. 6. The control queues 131 as shown in FIGS. 5 and 6 may be considered to have substantially identical constructions.

A status queue 132 is shown on the host side of the PCI bus 130. The status queue 132 may be considered to be included in the host memory 32 in FIG. 2. The status queue 132 may be considered to constitute two (2) status queues, one as shown in FIG. 5 and the other as shown in FIG. 6. The status queues 132 as shown in FIGS. 5 and 6 may be considered to have substantially identical constructions.

The status queues 132 in FIGS. 5 and 6 are associated with a plurality of buffers 134*a*, 134*b*, 134*c*, etc. on the host side of the PCI bus 130. The buffers 134*a*, 134*b* and 134*c* may be considered to be included in the host memory 32. A plurality of buffer descriptors 136*a*, 136*b*, 136*c*, etc. on the host side of the PCI bus 130 are respectively connected to individual ones of the buffers 134*a*, 134*b* and 134*c*. The buffer descriptor 136*a* is connected to the buffer descriptor 136*b* and the buffer descriptor 136*b* is connected to the buffer descriptor 136*c*. The buffer descriptor 136*a* has a connection 145*a* from the status queue 132.

The status queue 132 and the control queues 131 are disposed in a control plane. The buffers 134*a*, 134*b* and 134*c* and the buffer descriptors 136*a*, 136*b* and 136*c* are disposed in a data plane. The separation between the control plane and the data plane is indicated by a broken line 138 in FIG. 5. Buffer descriptors 140*a*, 140*b* and 140*c* are disposed in the data plane on the same side of the PCI bus 130 as the control queue 131. The buffer descriptors 140*a*, 140*b* and 140*c* are mirror images of the buffer descriptors 136*a*, 136*b* and 136*c*. A connection or pointer 145*b* is provided from the control queue 131 to the buffer descriptor 140*a*. The buffer descriptor 140*a* is connected to the buffer descriptor 140*b* and the buffer descriptor 140*b* is connected to the buffer descriptor 140*c* in a manner similar to the connections between the buffer descriptors 136*a*, 136*b* and 136*c*.

When data cells are to be transferred from the host memory 32 to the line 45 in FIG. 2, the host writes to the control queue 131 across the PCI bus 130 in FIG. 5 that it has information in the host memory 32 that it wishes to transfer to the line 45. This is provided by the pointer 145*b* from the control queue 131 to the buffer descriptor 140*a*. The segmentation and re-assembly (SAR) sub-system 29 then reads the cell payload from the host memory 32 and transfers this information to the line 45. After all of the information to be transferred from the host memory 32 has been transferred to the line 45, the segmentation and re-assembly (SAR) sub-system 29 writes to the status queue 132 that it has completed the transfer. This is provided by the pointer 145*a* to the buffer descriptor 140*a* from the status queue 132.

During the transfer described in the previous paragraph, the control queue 131 in FIG. 5 initially activates the buffer descriptor 140*a* to obtain the transfer of the cell payload across the PCI bus to the SAR 29 from the buffer 134*a* associated with the buffer descriptor 140*a*. When all of the information has been transferred from the buffer 134*a*, the buffer descriptor 140*a* causes the buffer descriptor 140*b* to be activated. This causes the cell payload to be transferred across the PCI bus to the SAR 29 from the buffer 134*b*. In like manner, the cell payload becomes transferred across the PCI bus 130 from the buffer 134c to the SAR 29 when all of the cell payload has been transferred from the buffer 134b.

As will be appreciated from the above discussion, the control queue 131 in FIG. 5 does not transfer cell payloads to the segmentation and re-assembly (SAR) sub-system 29. The control queue 131 provides control information to the buffer descriptors 140a, 140b and 140c in the data plane but these buffer descriptors are on the same side of the PCI bus as the control queue. This control information constitutes pointers to the buffer descriptors 140a, 140b and 140c on the SAR side. The pointers may be considered as addresses to the buffer descriptors 140a, 140b and 140c.

In response to the control information described in the previous paragraph, the buffer descriptors 136a, 136b and 136c provide for the transfer of the cell payloads in the buffers 140a, 140b and 140c across the PCI bus 130 to the SAR 29 for passage to the line 45 in FIG. 2. When the transfer of the cell payload to the line 45 has been completed, the SAR 29 writes to the host that it has completed the transfer. In this writing, the SAR 29 points to the buffer descriptors 136a, 136b and 136c on the host side. By providing this arrangement, the PCI bus 130 is not tied up by having the host read across the PCI bus while the transfer of the cell payload from the host buffers 134a, 134b and 134c across the PCI bus 130 to the SAR 29 is taking place.

As will be seen, buffers (134a, 134b and 134c) are provided only on the host side of the PCI bus 130. However, buffer descriptors (136a, 136b and 136c and 140a, 140b and 140c) are provided on both sides of the PCI bus 130. The buffer descriptors 140a, 140b and 140c are provided on the SAR side of the PCI bus 130 so that the SAR 29 will not have to read across the PCI bus 130. The SAR 29 is able to read the buffer descriptors 140a, 140b and 140c on the SAR side of the PCI bus 130 and provide the indications to the host that all of the cell payload in the buffers 134a, 134b and 134c has been transferred from the host to the line 45.

A read pointer 148 is provided in the host to the status queue 132. This pointer is designated as "READ". This pointer indicates the address in the status queue 132 in FIG. 5 where information will be read out of the status queue at any instant. A pointer 162 designated as "READ_UD" (meaning read-update) extends from the status queue 132 across the PCI bus to the SAR 29. This pointer is essentially a copy of the pointer 148. This pointer is provided so that the SAR 29 will not have to read across the PCI bus 130 to ascertain the address read by the read pointer 148 at the host.

As indicated by the pointer 162, the host writes periodically across the PCI bus 130 to the SAR 29 the address where information is being read by the host out of the status queue 132. This writing occurs only periodically to minimize the amount of time that the PCI bus 130 is tied up in the writing of such address from the host to the SAR 29. A pointer 164 is also provided from the SAR across the PCI bus 130 to the status queue 132. This pointer is designated as "WRITE". It provides an indication from the SAR of the address in the status queue 132 in FIG. 5 where the SAR is going to write next into the status queue. The pointers 148, 162 and 164 are also shown in FIG. 6.

In FIG. 5, a pointer is indicated at 160 and is designated as "READ". It provides an address indicating where the SAR 29 is going to read the control queue 131 in FIG. 5 at any instant. A pointer 150 extends from the host to the control queue 131 in FIG. 5. This pointer is designated as "READ_UD" (meaning read update). This pointer is essentially a copy of the pointer 160. As indicated by this pointer, the SAR writes periodically across the PCI bus 130 to the host the address where the information is being read out of the control queue 131. This writing is provided so that the host will not have to read across the PCI bus to ascertain the address read by the pointer 160 in the SAR. The writing provided by the pointer 150 occurs only periodically to minimize the amount of time that the PCI bus 130 is tied up in the writing of such address from the SAR. A pointer 152 is also provided from the host across the PCI bus 130 to the control queue 131 in FIG. 5. This pointer is designated as "WRITE". It indicates the address in the control queue 131 where the host is going to write next into the control queue. The pointers 160, 150 and 152 are also indicated in FIG. 6.

In FIG. 5, the host writes into the control queue 131 information that points to full buffers 134a, 134b and 134c. This pointer indicates that information can be transferred out of the buffers 134a, 134b and 134c across the PCI bus 130 to the SAR 29 and then to the line 45 in FIG. 2. In FIG. 5, the SAR 29 writes across the PCI bus 130 into the status queue 132, pointing to the empty buffers 134a, 134b and 134c. This indicates that all of the cell payload in these buffers has been transferred out of these buffers across the PCI bus 130 to the line 45.

FIG. 6 has the same stages in the control plane as FIG. 5. However, in FIG. 6, cell payloads are being transferred in the data plane from the interfacing line 30 in FIG. 2 to the buffers 134a, 134b and 134c in the host memory 32. Because of this, there are some differences in the data plane between FIGS. 5 and 6. In FIG. 6, the host writes across the PCI bus 130 to the SAR 29 information that points to the empty buffers 134a, 134b and 134c. This is indicated by pointers 170 extending between the buffer descriptors 136a, 136b and 136c and the control queue 131 in FIG. 6. These pointers indicate to the SAR 29 that the cell payload from the interfacing line 30 in FIG. 2 can be transferred across the PCI bus 130 to the buffers 134a, 134b and 134c in the host. In FIG. 6, the SAR writes across the PCI bus 130 into the status queue 132, pointing to full buffers 134a, 134b and 134c in the host. In effect, the SAR 29 is pointing to the buffers 134a, 134b and 134c so that the host can transfer the cell payload in the buffers to sources connected to the host.

The word "Circular" is used in FIGS. 5 and 6 in modification of the words "Status Queue" to identify a preferable type of status queue 132. The word "circular" is also used in FIGS. 5 and 6 in modification of the words "control queue" to identify a preferable type of control queue 131.

Figure 7:
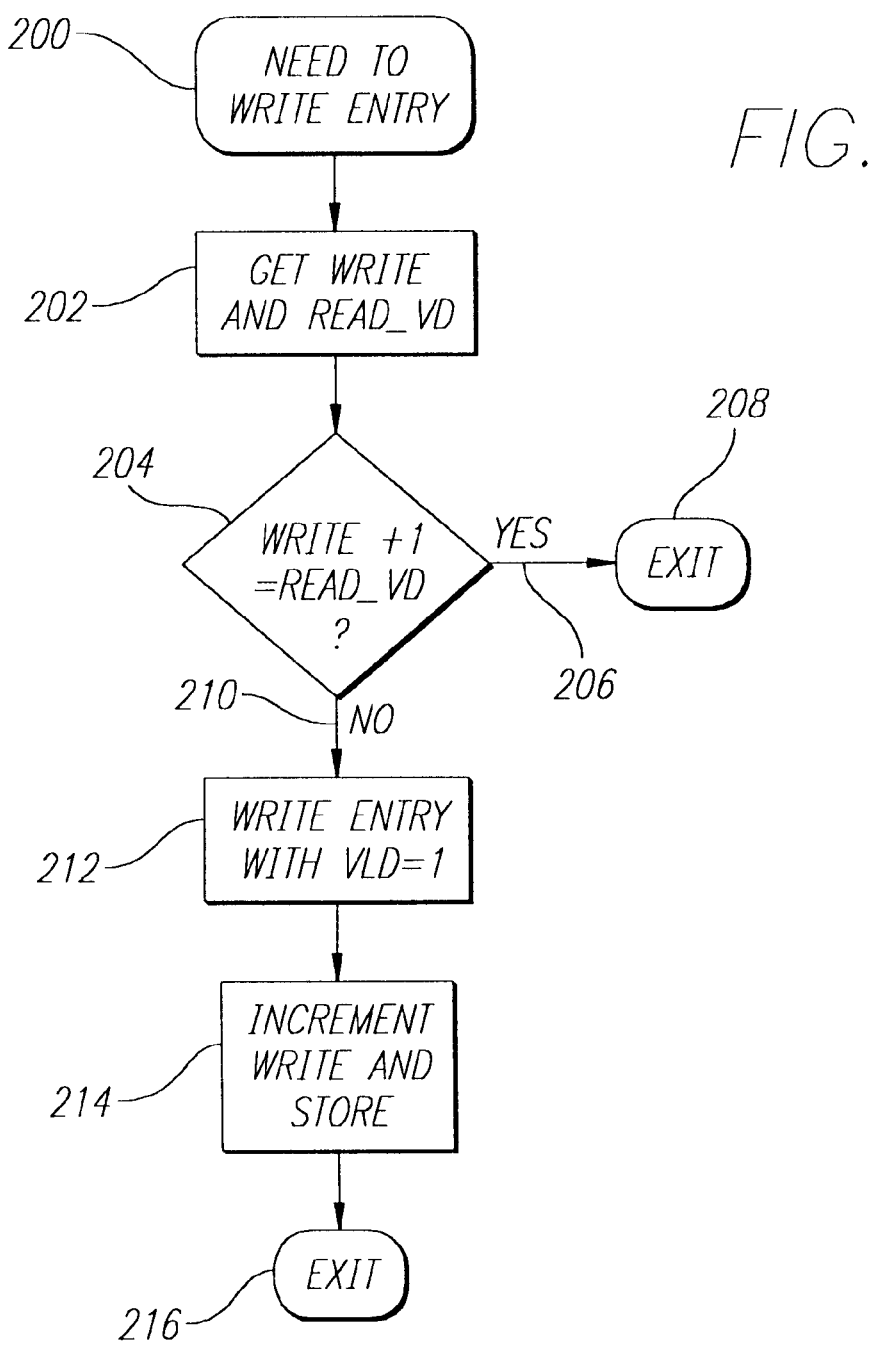
FIGS. 7 and 8 provide flow charts indicating the process of a control queue (shown in FIGS. 5 and 6) during the operations of segmentation and re-assembly.
Figure 8:
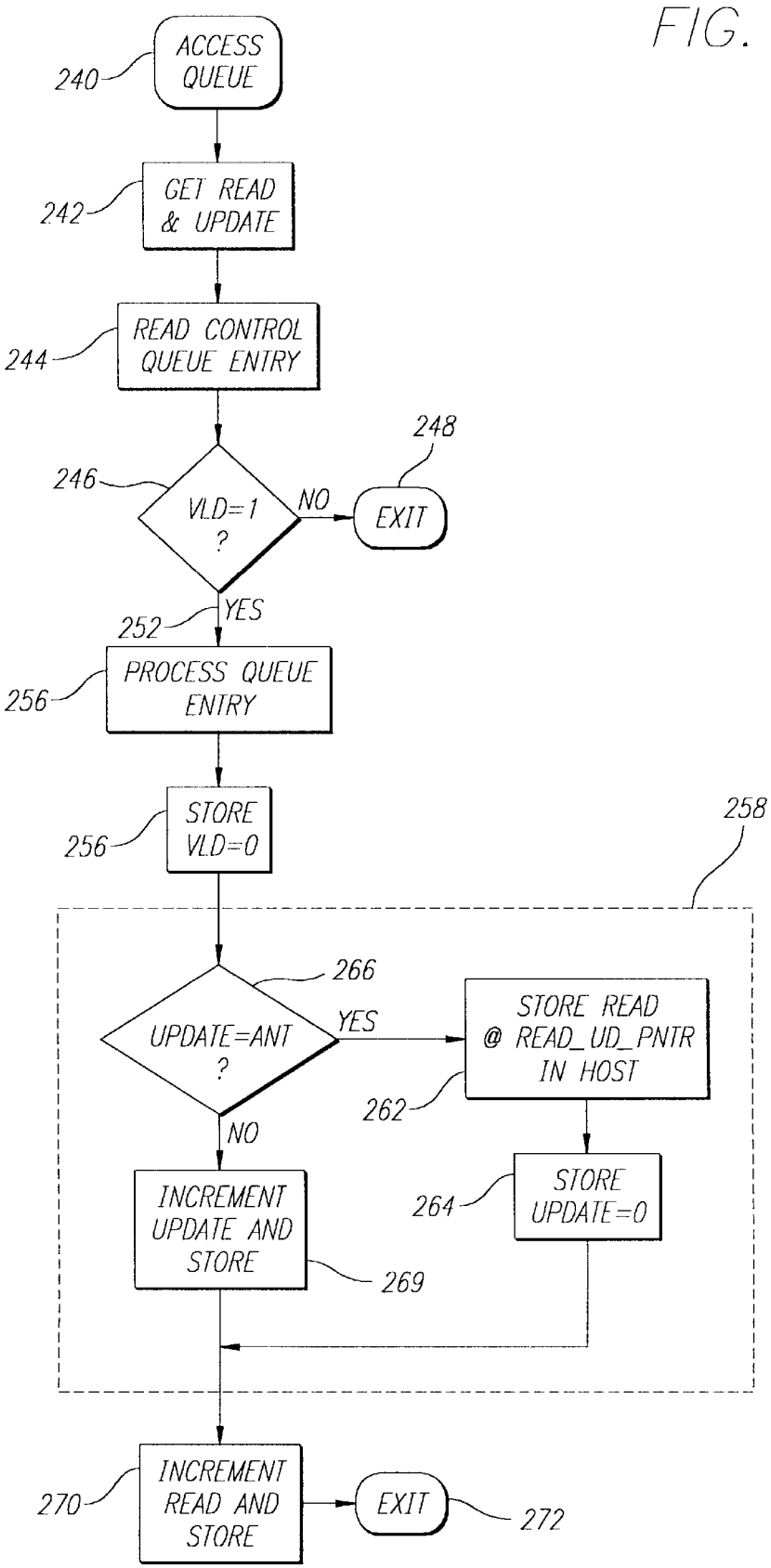

FIGS. 7 and 8 provide a flow chart indicating the process of the control queue 131 during segmentation and reassembly. FIG. 7 relates to the control queue processing of host flow and FIG. 8 relates to the control queue processing of SAR flow. In reading the successive blocks in FIG. 7, reference should be made to the table in FIG. 11 which provides a definition of the different terms shown in the different blocks in FIG. 7. These definitions are supplemented by the previous discussion relating to FIGS. 5 and 6 and the subsequent discussion relating to FIGS. 7 and 8.

The functions shown in FIG. 7 are initiated by a block 200 which indicates that the host has to write an entry into the control queue 131 in the control memory 38 in the SAR sub-system 29. A block 202 is then activated in FIG. 7. This block provides an indication of the current host position in the control queue 131—in other words, where the host is writing into the control queue in the control memory 38. In the block 202, the host also reads READ-UD. See the pointer 150 in FIG. 5 and 6 and the discussion relating to the pointer 150.

In the next entry, the current position of the host in the control queue 131 in the control memory 38 is incremented by an integer. This is indicated at 204 in FIG. 7. If this current position is the same as the last known address written by the SAR sub-system 29 across the PCI bus 130 to the host to indicate where the SAR is in the control queue 131, the host thinks that the control queue in the control memory 38 is full. This is indicated at 206 in FIG. 7. As indicated at 208 in FIG. 7, the host then exits out of the routine of continuing to write to the control queue in the control memory 38.

If the current address of the host in the control queue 131 in the control memory 38 is not the same as the last known address in the control queue as seen by the SAR, an indication is provided at 210. The host then writes across the PCI bus 130 into the control queue 131 in the control memory 38 with valid=1. This is indicated at 212 in FIG. 7. As the host writes across the PCI bus 130 into the control queue 131 in the control memory 38, the host pointer 152 to the control queue 131 in the control memory 38 is incremented. This is indicated at 214 in FIG. 7. When the writing from the host to the control queue 131 in the control memory 38 is completed, an exit is provided as indicated at 216 in FIG. 7.

FIG. 8 is a flow diagram indicating how the SAR sub-system 29 processes entries from the control queue 131. In reading the successive blocks in FIG. 8, reference should be made to the table shown in FIG. 11 which provides a definition of the different terms shown in the blocks in FIG. 8. These definitions are supplemented by the previous discussion relating to FIGS. 5 and 6 and by the subsequent discussion relating to FIG. 8.

As a first step as indicated at 240 in FIG. 8, the SAR sub-system 29 accesses the control queue 131 in the control memory 38. As indicated at 242, the SAR sub-system 29 then reads the current position of the SAR in the control queue 131 in the control memory 38. It also counts the number of times that the processing steps shown in broken lines 258 in FIG. 8 have been performed. The SAR sub-system 29 then reads the control information that the host has written into the control memory 38. This is indicated at 244 in FIG. 8.

Valid is a bit in the control queue 131 in the control memory 38. A test is made as at 246 in FIG. 8 to determine whether the valid bit is a binary 1 or a binary 0. If the bit value is not a binary 1, this indicate s that the entry in the control queue 131 in the control memory 38 is not valid. Under such circumstances, an exit occurs as indicated at 248 and access occurs again at the access queue 240 at a subsequent time. If the valid bit is a binary 1, an indication is provided on a line 252 in FIG. 8. The control entry is then processed as at 254. In accordance with this control entry processing, the SAR sub-system 29 processes control information in the control queue 131 in the control memory 38.

The control information in the control queue 131 in the control memory 38 tells the SAR sub-system 29 the addresses of the buffers 134a, 134b and 134c. After the SAR has processed this information, the VLD (valid) entry in the control queue becomes 0. This is indicated at 256 in FIG. 8. The SAR sub-system 29 then periodically writes to the host its position in the control queue 131 in the control memory 38. This periodicity may occur once in every fixed number (e.g. 5) of processing cycles. This periodic processing is shown within the rectangle 258 defined by broken lines in FIG. 8.

In one sense, it is desirable that the fixed number (e.g. 5) of cycles should be large to minimize the amount of time that the PCI bus is tied up by the transfer of information across the PCI bus 130 from the host to the SAR sub-system 29. On the other hand, increasing the fixed number of cycles is disadvantageous because it decreases the accuracy of the information in the period of time between the successive number of processing cycles until the next fixed number (e.g. 5) of processing cycles has occurred.

As a first step in the processing cycles shown within the broken block 258 in FIG. 8, the number of processing cycles is indicated as at 266 since the last occurrence of the fixed number (e.g. 5) of processing cycles. As indicated at 262, the sub-system 29 reads the current SAR position in the control queue 131 in the control memory 38 and provides the host with this information in every fixed number (e.g. 5) of the processing cycles. The count of the processing cycles is then returned to zero (0) as indicated at 264 in FIG. 8, when the fixed number (e.g. 5) of the processing cycles has occurred.

When the count of the number of the processing cycles is other than the fixed number (e.g. 5), the count is incremented upon the occurrence of each successive processing cycle. This is indicated at 269 in FIG. 8. Upon each increment in the count as indicated in the blocks 269 and 266, the SAR sub-system 29 increments its pointer in the control queue 131 in the control memory 38 and stores this information. This is indicated at 270 in FIG. 8. When the processing of the data cells has been completed, an exit is provided as at 272.

Figure 9:
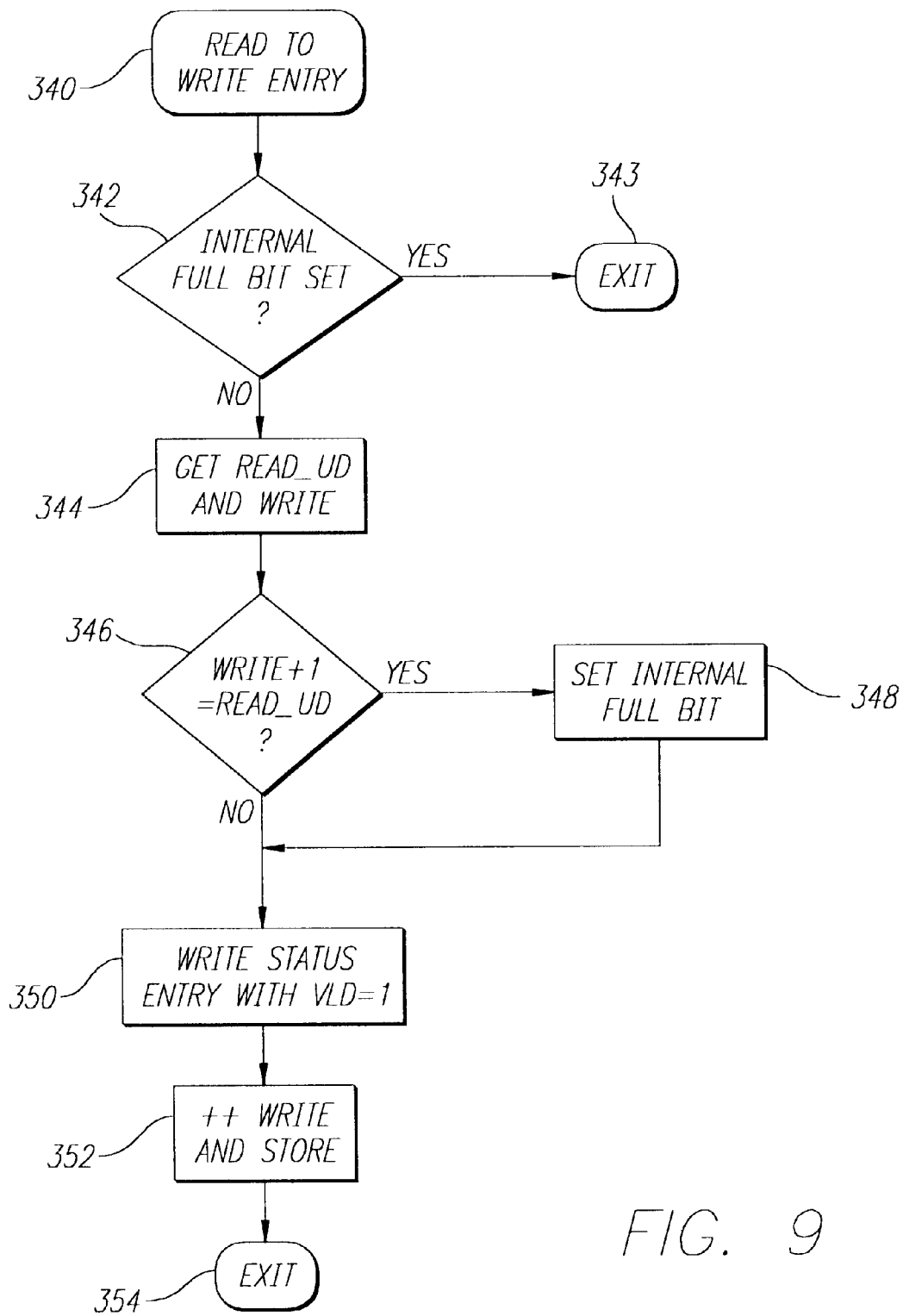
FIGS. 9 and 10 provide flow charts indicating the process of a status queue (shown in FIGS. 5 and 6) during the operations of segmentation and re-assembly.
Figure 10:
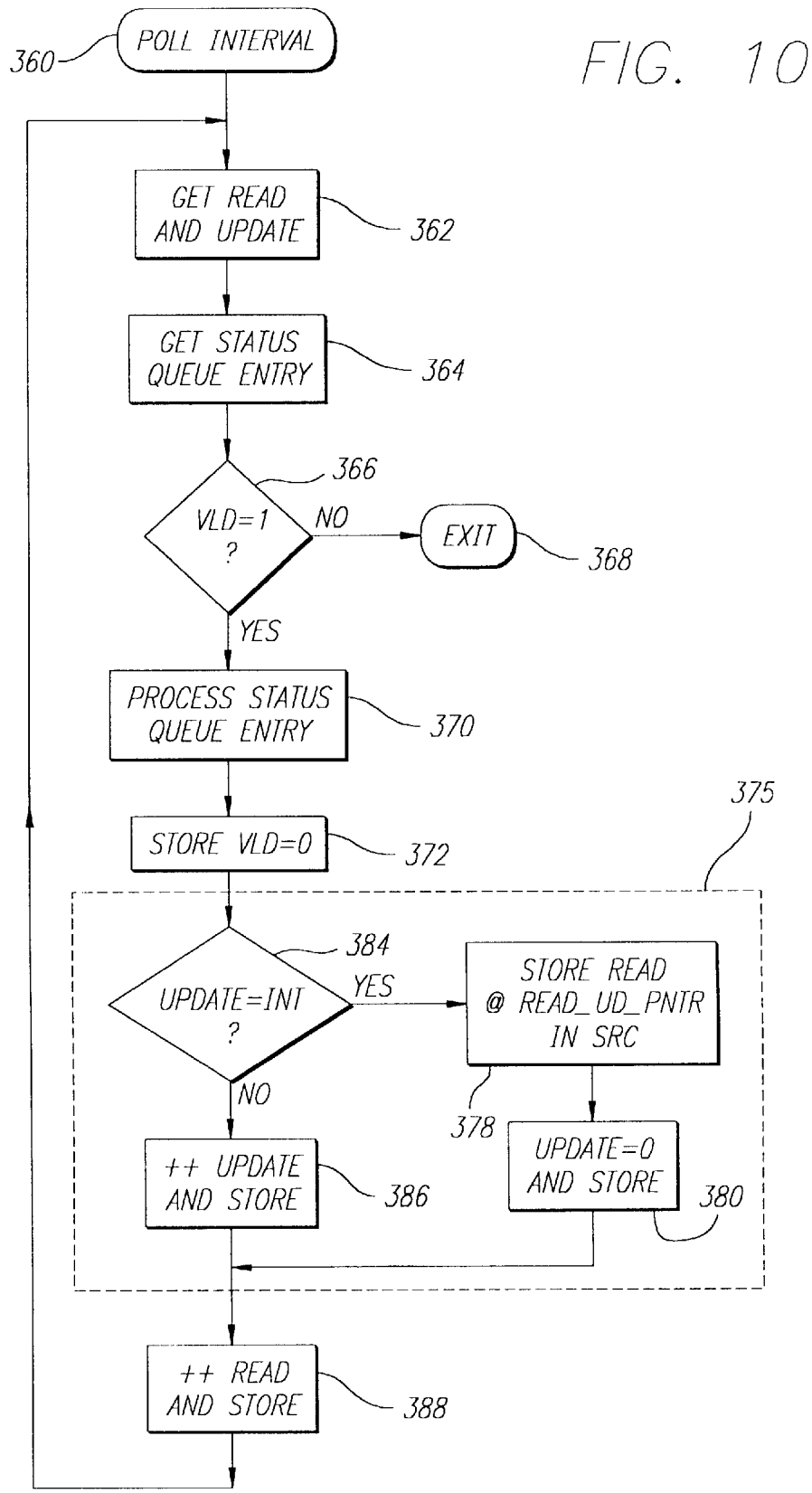

FIGS. 9 and 10 provide a flow chart indicating the status queue process during segmentation and re-assembly. FIG. 9 relates to the status queue processing of SAR flow and FIG. 10 relates to the status queue processing of host flow. In reading the successive blocks in FIG. 9, reference should be made to the table shown in FIG. 12, which provides a definition of the different terms shown in the blocks in FIG. 9. These definitions are supplemented by the previous discussion relating to FIGS. 5 and 6 and by the subsequent discussion relating to FIGS. 9 and 10.

As a first step in FIG. 9, the SAR sub-system 29 needs to write to the status queue 132. This is indicated at 340 in FIG. 9. The SAR sub-system 29 checks to see if the status queue 132 is full as indicated at 342 in FIG. 9. A binary bit of 1 may be provided if the status queue 132 is full. If the status queue 132 is full, the SAR sub-system 29 exits as indicated at 343 and performs no further work except for returning to the block 340 at a subsequent time.

If the status queue 132 in the host is not full, the SAR sub-system 29 indicates the last known position in the status queue as seen by such SAR sub-system. This is indicated by the READ_UD pointer 162 in FIG. 6 and is defined by the READ_UD variable in the base table (FIG. 12). The SAR sub-system 29 also reads the current position 164 (FIGS. 5 and 6) of the SAR into the status queue 132. This is indicated by the WRITE variable in the base table (FIG. 12). These two (2) indications provide information to the SAR sub-system as to whether the status queue 132 is full.

The WRITE pointer 164 (FIGS. 5 and 6) is then incremented by a count of a binary 1. The incremented position of the pointer 164 in the status queue 132 is then compared with the last known host position in the status queue as seen by the SAR sub-system 29. This comparison is indicated at 346. If the comparison indicates an equality, this provides an indication that the status queue is full. A binary indication is then provided internally to indicate that the status queue 132 is full. This is indicated at 348 in FIG. 9.

A binary 1 is written into the status queue 132 as indicated at 350 in FIG. 9. This indicates that the status queue entry contains valid information that the host can process. The current position of the SAR in the status queue 132 is then incremented and the incremented position is stored. This is indicated at 352 in FIG. 9. An exit is then made as at 354.

FIG. 10 is a flow diagram showing host entry flow into the status queue 132. In reading the successive blocks in FIG. 10, reference should be made to the table shown in FIG. 12, which provides a definition of the different terms shown in FIG. 12. These definitions are supplemented by the previous discussion relating to FIGS. 5 and 6 and the subsequent discussion relating to FIG. 10.

As a first step, the host provides a poll interval as indicated at 360 in FIG. 10. This is a specified period of time that is provided by the host and entered periodically by the host. The host then reads the current host position in the status queue 132 and the number of entries into the status queue 132 since the last writing into the status queue of the host position in the SAR as seen by the SAR sub-system 29. This is indicated at 362.

As indicated at 364, the host then reads the next entry that the SAR sub-system 29 writes to the host. The host then determines whether valid=1 as indicated at 366 in FIG. 10. A no answer indicates that the entry into the status queue is not valid. If the answer is no, the host exits as indicated at 368 and waits for the next poll interval. If the answer is yes, the host processes entries in the status queue 132 from the SAR sub-system 29. This is indicated at 370 in FIG. 10. After the host has processed such entries in the status queue 132, the host writes a valid=0 in such entries as indicated at 372 in FIG. 10.

A determination is then made, as indicated at 374, whether a fixed number (e.g. 5) of processing cycles has occurred. The determination of the fixed number (e.g. 5) of the processing cycles is made in blocks within a rectangle 375 with broken lines. If the answer is yes as indicated at 376 in FIG. 10, the host writes across the PCI bus 130 to the SAR sub-system 29 to inform the SAR system of its position into the status queue since the last time that it provided the SAR sub-system such information. This writing is provided by the READ_UD Pointer 150 in FIG. 5. The host does this only once in every fixed number of processing cycles to minimize the amount of time that it ties up the PCI bus. This writing across the PCI bus is indicated at 378 in FIG. 10. The host then returns the count of the number of processing cycles to zero (0) to initiate a new count of the number of the processing cycles to the fixed number (e.g. 5). This is indicated at 380 in FIG. 10.

If the count of the number of processing cycles is not equal to the fixed number (e.g. 5), an indication is provided on a line 384 in FIG. 10. This causes the number of cycles to be incremented by one (1) every time that the number of the queue entries in the status queue 132 is updated since the last time that the host has informed the SAR subsystem 29 what it has read out. This is indicated at 386 in FIG. 10. The read pointer indicating the host position in the status queue is then incremented as indicated at 388. This occurs whether the count of the successive processing cycles is at the fixed number and is being returned to zero (0) as indicated at 380 or whether the count of the processing cycles is being incremented toward the fixed number (e.g. 5) as indicated at 386.

FIG. 11 is a table defining certain terms used in the blocks shown in FIGS. 7 and 8. The definitions included in the table shown in FIG. 11 may be considered to supplement the definitions provided in the specification. FIG. 12 is a table defining certain terms used in the blocks shown in FIGS. 9 and 10. The definitions included in the table shown in FIG. 12 may be considered to supplement the definitions provided in the specification.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. In a method of controlling the writing of a cell payload across a system bus between a host on the host side of the system bus and a segmentation and reassembly (SAR) subsystem on the SAR side of the system bus, the steps of:

providing a status queue in a control plane on the host side of the system bus, providing a control queue in the control plane on the SAR side of the system bus, providing a buffer memory in a data plane on the host side of the system bus for the flow of the cell payload selectively from or to the buffer memory, providing an address in the status queue for controlling the selective transfer of the cell payload from or to the buffer memory, providing an address in the control queue for controlling the selective transfer of the cell payload from or to the buffer memory, and providing for the writing of the cell payload selectively across the system bus from or to the buffer memory in accordance with the addresses provided in the status queue and the control queue.

2. In a method of controlling the writing of a cell payload across a system bus between a host on the host side of the system bus and a segmentation and reassembly (SAR) subsystem on the SAR side of the system bus, the steps of:

providing a status queue in a control plane on the host side of the system bus, providing a control queue in a control plane on the SAR side of the system bus, providing a buffer memory in a data plane on the host side of the system bus for the flow of cell payload from or to the buffer memory, providing an address in the status queue for controlling the selective transfer of the cell payload from or to the buffer memory, providing an address in the control queue for controlling the selective transfer of the cell payload from or to the buffer memory, providing for the writing of the cell payload selectively across the system bus from or to the buffer memory in accordance with the addresses provided in the status queue and the control queue, providing the cell payload on a receive cell interface line in the SAR, and writing the cell payload from the receive cell interface line to the buffer memory in accordance with the addresses provided in the status and control queues.

3. In a method of controlling the writing of a cell payload across a system bus between a host on the host side of the system bus and a segmentation and reassembly (SAR) subsystem on the SAR side of the system bus, the steps of:

providing a status queue in a control plane on the host side of the system bus, providing a control queue in a control plane on the SAR side of the system bus, providing a buffer memory in a data plane on the host side of the system bus for the flow of cell payload from or to the buffer memory, providing an address in the status queue for controlling the selective transfer of the cell payload from or to the buffer memory, providing an address in the control queue for controlling the selective transfer of the cell payload from or to the buffer memory, providing for the writing of the cell payload selectively across the system bus from or to the buffer memory in accordance with the addresses provided in the status queue and the control queue, providing a transmit cell interface line in the SAR, and writing the cell payload from the buffer memory to the transmit cell interface line in accordance with the status and control queues.

4. In a method as set forth in claim 1, the step of:

providing an indication of the address in the control plane in the selective one of the status queue and the control queue as read by the selective one of the status queue and the control queue, providing an indication in the control plane of the address in the selective one of the status queue and the control queue, as seen by an address in the control plane from the other one of the status queue and the control queue, where entries are being written into the selective one of the status queue and the control queue to control the transfer of the cell payload to or from the buffer memory, and providing incremental entries of the address in the selective one of the control queue and the status queue in accordance with the address in the selective one of the status queue and the control queue as read in the control plane by the selective one of the status queue and the control queue and as written in the control plane by the other one of the status queue and the control queue.

5. In a method as set forth in claim 4, the step of:

incrementing the address into the selective one of the status queue and the control queue until the address in the selective one of the status queue and the control queue as read by the selective one of the status queue and the control queue coincides with the address in the selective one of the status queue and the control queue as read by the other one of the status queue and the control queue.

6. In a method of controlling the writing of a cell payload across a system bus between a host on the host side of the system bus and a segmentation and reassembly (SAR) subsystem on the SAR side of the system bus, the steps of:

providing a status queue in a control plane on the host side of the system bus, providing a control queue in the control plane on the SAR side of the system bus, providing a buffer memory in a data plane on a selective one of the host side and the SAR side of the system bus for the flow of the cell payload selectively from or to the buffer memory, providing a buffer descriptor in the data plane on the host side of the system bus for controlling the transfer of the cell payload to or from the buffer memory, providing for a writing of the cell payload to or from the buffer memory in accordance with commands from a selective one of the status queue and the control queue to the buffer descriptor, providing an address in the status queue for introduction to the buffer descriptor to control the selective transfer of the cell payload from or to the buffer memory, providing an address in the control queue for introduction to the buffer descriptor to control the selective transfer of the cell payload from or to the buffer memory, and providing for the writing of the cell payload selectively across the system bus from or to the buffer memory in accordance with the addresses provided in the buffer descriptor from a selective one of the status queue and the control queue.

7. In a method as set forth in claim 6, the steps of:

providing the cell payload on a receive cell interface line in the SAR, and writing the cell payload from the receive cell interface line to the buffer memory in accordance with the addresses provided in the status and control queues for introduction to the buffer descriptor on the same side of the system bus as the status queue to control the selective transfer of the cell payload from or to the buffer memory.

8. In a method as set forth in claim 6, the steps of:

providing a transmit cell interface line in the SAR, and writing the cell payload from the buffer memory to the transmit cell interface line in accordance with the addresses provided in the status and control queues for introduction to the buffer descriptor to control the transfer of the cell payload to the transmit cell interface line.

9. In a method as set forth in claim 6, the steps of:

providing an indication of the address in the control plane in the selective one of the status queue and the control queue as read by the selective one of the status queue and the control queue, providing an indication in the control plane of the address in the selective one of the status queue and the control queue, as written by an address in the control plane from the other one of the status queue and the control queue, where entries are being written into the selective one of the status queue and the control queue to control the transfer of the cell payload to or from the buffer memory, and providing incremental entries of the address in the selective one of the control queue and the status queue in accordance with the address in the selective one of the status queue and the control queue as written in the control plane by the selective one of the status queue and the control queue and as written in the control plane by the other one of the status queue and the control queue.

10. In a method as set forth in claim 6, the steps of:

incrementing the address into the selective one of the status queue and the control queue until the address in the selective one of the status queue and the control queue as written by the selective one of the status queue and the control queue coincides with the address in the selective one of the status queue and the control queue as written by the other one of the status queue and the control queue.

11. In a method of controlling the writing of a cell payload across a system bus between a host on the host side of the system bus and a segmentation and reassembly (SAR) subsystem on the SAR side of the system bus, the steps of:

providing a status queue in a control plane on the host side of the system bus, providing a control queue in the control plane on the SAR side of the system bus, providing a buffer memory in a data plane on a selective one of the host side and the SAR side of the system bus for the flow of the cell payload selectively from or to the buffer memory, providing a first buffer descriptor in the data plane on the host side of the system bus for controlling the transfer of the cell payload to or from the buffer memory, providing a second buffer descriptor in the data plane on the SAR side of the system bus for controlling the transfer of the cell payload to or from the buffer memory, providing for a transfer of the commands from the status queue and the control queue between the buffer descriptors on the host side and the SAR side of the system bus, providing for a writing of the cell payload to or from the buffer memory in accordance with commands from a selective one of the status queue and the control queue to the buffer descriptor on the same side of the system bus as the selective one of the status queue and the control queue, providing an address in the status queue for introduction to one of the first and second the buffer descriptors to control the selective transfer of the cell payload from or to the buffer memory, providing an address in the control queue for introduction to one of the buffer descriptors on the same side of the system bus as the control queue to control the selective transfer of the cell payload from or to the buffer memory, and providing for the writing of the cell payload selectively across the system bus from or to the buffer memory in accordance with the addresses provided in the buffer descriptors from the status queue and the control queue.

12. In a method as set forth in claim 11, the steps of:

providing a first line on the SAR side of the system bus, providing for the transfer of the cell payload from the buffer memory to the first line in accordance with indications from the host that it has such cell payloads to be transferred to the first line.

13. In a method as set forth in claim 12, the steps of:

providing an address written by the host into the control queue, providing an address written by the SAR periodically to the host where the SAR is a in the control queue, and determining if the control queue is full by comparing the address written by the host into the control queue with the address written by the SAR periodically to the host where the SAR is in the control queue.

14. In a method as set forth in claim 11, providing for the transfer of the cell payload from the SAR to the buffer memory in accordance with indications from the SAR that it has such cell payloads to be transferred to the buffer memory.

15. In a method as set forth in claim 14, the steps of:

providing an address written by the SAR into the status queue, providing an address written by the host periodically to the SAR where the host is in the status queue, and determining if the buffer memory is full by comparing the address written by the SAR into the status queue with the address written by the host periodically to the status queue where the host is in the status queue.

16. In a method of controlling the writing of a cell payload across a system bus between a host in the host side of the system bus and a segmentation and reassembly (SAR) subsystem on the SAR side of the system bus, the steps of:

providing a status queue in a control plane on the host side of the system bus, providing a control queue in the control plane on the SAR side of the system bus, providing a buffer memory in a data plane on a selective one of the host side and the SAR side of the system bus for the flow of the cell payload selectively to the buffer memory, providing a buffer descriptor in the data plane on one side of the system bus for controlling the transfer of the cell payload to the buffer memory, and providing for the writing of the cell payload selectively across the system bus to the buffer memory in accordance with commands from the status queue to the buffer descriptor and in accordance with indications from the SAR to the buffer descriptor that it has such cell payloads to be transferred to the buffer memory.

17. In a method as set forth in claim 16, the steps of:

providing an address written by the SAR into the status queue, providing an address written periodically by the host to the SAR where the host is in the status queue, and determining if the buffer memory is full by comparing the address written by the SAR into the status queue with the address written by the host periodically to the SAR where the host is in the status queue.

18. In a method as set forth in claim 16, the steps of:

providing the cell payload on a receive cell interface line in the SAR, providing the buffer descriptor on the same side of the system bus as the status queue, writing the cell payload from the receive cell interface line to the buffer memory in accordance with commands from the status queue to the buffer descriptor and in accordance with indications from the SAR to the buffer descriptor that it has such cell payloads to be transferred to the buffer memory.

19. In a method as set forth in claim 16, providing incremental entries of the address written by the SAR into the status queue until such incremental address corresponds to the address written by the host periodically to the SAR where the host is in the status queue.

20. In a method as set forth in claim 16, the steps of:

providing the buffer descriptor on the status queue side of the system bus, the buffer descriptor constituting a first buffer descriptor, providing a second buffer descriptor on the control queue side of the system bus, the first and second buffer descriptors being substantially identical, and connecting the first and second buffer descriptors to each other.

21. In a method as set forth in claim 17, the steps of:

providing the cell payload on a receive cell interface line in the SAR, providing the buffer descriptor on the same side of the system bus as the status queue, writing the cell payload from the receive cell interface line to the buffer memory in accordance with the addresses provided in the status and control queues for introduction to the buffer descriptor to control the selective transfer of the cell payload to the buffer memory, providing incremental entries of the address written by the SAR into the status queue until such incremental address corresponds to the address written by the host periodically to the SAR where the host is in the status queue, providing the buffer descriptor on the status queue side of the system bus, the buffer descriptor constituting a first buffer descriptor, providing a second buffer descriptor on the control queue side of the system bus, the first and second buffer descriptors being substantially identical, and connecting the first and second buffer descriptors to each other.

22. In a method of controlling the writing of a cell payload across a system bus between a host in the host side of the system bus and a segmentation and reassembly (SAR) subsystem on the SAR side of the system bus, the steps of:

providing a transmit cell interface line, providing a status queue in a control plane on the host side of the system bus, providing a control queue in the control plane on the SAR side of the system bus, providing a buffer memory in a data plane on a selective one of the host side and the SAR side of the system bus for the flow of the cell payload from the buffer memory, providing a buffer descriptor in the data plane on one side of the system bus for controlling the transfer of the cell payload from the buffer memory to a transmit cell interface line in the SAR, and providing for the writing of the cell payload selectively across the system bus from the buffer memory to the transmit cell interface line in accordance with indications from the host to the buffer descriptor that it has such cell payload to be transferred to the transmit cell interface line.

23. In a method as set forth in claim 22, the steps of:

providing an address read by the host into the control queue, providing an address written periodically by the SAR to the host where the SAR is in the control queue, and determining if the control queue is full by comparing the address written by the host into the control queue with the address written by the SAR periodically to the host where the SAR is in the control queue.

24. In a method as set forth in claim 23, the steps of:

providing the buffer descriptor on the same side of the system bus as the control queue, and writing the cell payload from the buffer memory in accordance with the addresses provided in the status and control queues for introduction to the buffer descriptor on the same side of the system bus as the control queue to control the selective transfer of the cell payload from the buffer memory to the transmit cell interface line.

25. In a method as set forth in claim 22, the step of:

providing incremental entries of the address written by the host into the control queue until such incremental address corresponds to the address written by the SAR periodically to the host where the SAR is in the control queue.

26. In a method as set forth in claim 22, the steps of:

providing the buffer descriptor on the control queue side of the system bus, the buffer descriptor constituting a first buffer descriptor, providing a second buffer descriptor on the status queue side of the system bus, the first and second buffer descriptors being substantially identical, and connecting the first and second buffer descriptors to each other.

27. In a method as set forth in claim 23, the steps of:

providing the buffer descriptor on the same side of the system bus as the control queue, and writing the cell payload from the buffer memory in accordance with the addresses provided in the status and control queues for introduction to the buffer descriptor on the same side of the system bus as the control queue to control the selective transfer of the cell payload from the buffer memory to the transmit cell interface line, providing incremental entries of the address written by host into the control queue until such incremental address corresponds to the address written by the SAR periodically to the host where the SAR is in control queue, providing the buffer descriptor on the control queue side of the system bus, the buffer descriptor constituting a first buffer descriptor, providing a second buffer descriptor on the status queue side of the system bus, the first and second buffer descriptors being substantially identical, and connecting the first and second buffer descriptors to each other.

* * * * *